United States Patent [19]

Matsumoto

[11] Patent Number: 5,448,732
[45] Date of Patent: Sep. 5, 1995

[54] MULTIPROCESSOR SYSTEM AND PROCESS SYNCHRONIZATION METHOD THEREFOR

[75] Inventor: Takashi Matsumoto, Tokyo, Japan

[73] Assignee: International Business Machines Corporation, Armonk, N.Y.

[21] Appl. No.: 944,803

[22] Filed: Sep. 14, 1992

Related U.S. Application Data

[63] Continuation of Ser. No. 603,083, Sep. 25, 1990, abandoned.

[30] Foreign Application Priority Data

Oct. 26, 1989 [JP] Japan ................. 1-277334

[51] Int. Cl.⁶ .............................................. G06F 9/00
[52] U.S. Cl. ..................... 395/650; 364/230; 364/271.2; 364/281.8; 364/DIG. 1; 364/931.46; 364/945.9; 364/949.93; 364/DIG. 2
[58] Field of Search ............ 395/650; 364/949.93, 364/945.9, 931.46, 281.8, 271.2, 230

[56] References Cited

U.S. PATENT DOCUMENTS

| | | | |
|---|---|---|---|
| 4,318,173 | 3/1982 | Freedman et al. | 364/200 |
| 4,387,427 | 6/1983 | Cox et al. | 364/200 |
| 4,590,555 | 5/1986 | Bourrez | 364/200 |
| 4,692,861 | 9/1987 | May | 364/200 |

FOREIGN PATENT DOCUMENTS

| | | |
|---|---|---|
| 0330836 | 9/1989 | European Pat. Off. . |
| 8900734 | 1/1989 | WIPO . |

OTHER PUBLICATIONS

"Stellix: UNIX for a Graphics Supercomputer" Proceedings of the Summer 1988 USENIX Conference, Jun. 20–24, 1988, USENIX Assoc. pp. 321–330, Thomas J. Teixeira & Robert F. Gurwitz.

IBM Technical Disclosure Bulletin, vol. 32, No. 1, Jun. 1989, pp. 260–262, "Device that Provides for Contention-Free Barrier Synchronization in a Multiprocessor".

IBM Technical Disclosure Bulletin, vol. 31, No. 11 Apr. 1989, pp. 382–389, "Law-Cast Device for Contention-Free Barrier Synchronization".

Proceedings 1989 International Conference Parallel Processing, Aug. 1989, vol. II titled "Synchronization Barrier and Related Tools for Shared Memory Parallel Programming" by B. D. Lubachevsky, pp. 175–179.

Microprocessing & Microprogramming, Jun. 1987, No. 3, pp. 179–192 titled "SHAMP: An Experimental Shared Memory Multimicroprocessor System for Performance Evaluation Parallel Algorithms" by D. Ghasal & L. Patnaik.

Computer Standards & Interfaces 1987, No. 1, pp. 97–105 titled "Integration of Real-Time & Consistency Constraints in Distributed Databases: The SIGMA Approach" by P. Minet & S. Sedillot.

IBM Technical Disclosure Bulletin, vol. 30, No. 5, pp. 373–374 titled "Selective Dispatch of Queued Tasks".

*Primary Examiner*—Kevin A. Kriess
*Assistant Examiner*—Dennis M. Butler
*Attorney, Agent, or Firm*—Lawrence D. Cutter

[57] ABSTRACT

A method and apparatus for synchronizing and scheduling multiple processes in a multiprocessor of processor resources as supplied from the processes. Through hierarchical and user controllable grouping of processes, overhead associated with processor allocation and synchronization is reduced.

9 Claims, 11 Drawing Sheets

MULTIPROCESSOR SYSTEM AND PROCESS SYNCHRONIZATION METHOD THEREFOR

This is a continuation of application Ser. No. 07/603,083 filed on Sep. 25, 1990 now abandoned.

BACKGROUND OF THE INVENTION

1. Field of the Invention

The present invention relates to a multiprocessor system, and in particular relates to a multiprocessor system which is capable of reducing overhead due to required synchronization among the processors and to ineffective scheduling. The overhead is reduced as much as possible to improve system performance and to provide effective usage of processor resources.

2. Background of the Problem

The advance of VLSI methods has provided multiprocessor systems with each system having many processors. Parallel processing, which enables one to perform tasks rapidly through the use of a plurality of processors, is also gaining in importance. In such multiprocessor systems, sometimes one processor uses the result of a process performed by another processor. In this situation, acknowledgement of the completion of that process, an important aspect of synchronization, is required. In order for a plurality of processors to operate in cooperation with one another, synchronization among processors is thus seen to be indispensable.

Conventional synchronization techniques are now described. In a computing system, control of real hardware resources are performed by an operating system (hereinafter referred to as an "OS"). A user or programmer describes operations by using the concept of "process" which virtualizes a real processor. Real processors are allocated to processes, one processor to one process, under control of an OS to perform the operations. Such allocation is referred to as "process scheduling" (hereinafter referred to simply as "scheduling").

In parallel processing, a plurality of processes which should operate in cooperation with one another are created, and parallel processing proceeds, keeping synchronization among the processes. Conventionally, the following two methods have been employed for synchronization. The first is the performance of synchronization through an OS, and the second is through the use of shared memory among processes. For synchronization, some kind of shared entity is required which enables the exchange of information among processes which are synchronized with one another. The first method uses an OS as the entity, and the second uses a memory. The problems associated with these two methods are now described. In the case where synchronization is achieved through an OS, a process which does not establish synchronization is removed from the allocated processor and enters a sleeping or idle state, and the freed processor is allocated to another process. In such a way, processor resources are effectively used. The synchronization through an OS however causes an undesirable overhead. The repetition of entering a sleeping state and thereafter receiving an allocation produces a degradation in performance. If the granularity of a program is large enough, the overhead can be neglected. In most cases it is not however negligible.

Figure 1:
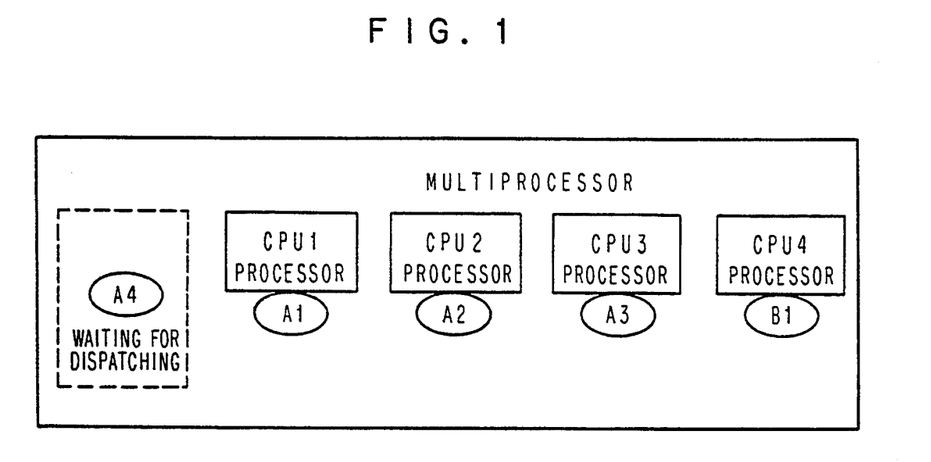
FIG. 1 is a block diagram illustrating the conventional method for dispatching processes to processors.

In the case that synchronization is achieved using busy and wait states and a shared memory rather than using an OS, the above overhead problem can be avoided. However, another problem can occur. As mentioned above, an OS dispatches one process to one processor at a time. During a single scheduling operation, the OS cannot usually assign a plurality of processes to a plurality of processors at one time. For example, consider a program where a plurality of processes are created for parallel processing and they operate in synchronization with one another. Depending on the scheduling operation, some processes in the group can be dispatched to processors and the remaining processes can be in an idle state waiting for dispatching. In this case, a process can try to establish synchronization with another process which is not scheduled to any processor and then an ineffective busy and wait condition can occur. An example is a case where processes are dispatched to processors as shown in FIG. 1, and the processes A1, A2 and A3 are in a loop of busy waiting (in synchronization) for use of the operational result of process A4. In such a case, while CPU time is being consumed, programs will not proceed until process A4 gets dispatched to one of the actual processors upon rescheduling by a time slice operation or the like. In addition to the scheduling problem, when a "barrier synchronization" (that is, when a plurality of processes each wait for the others at a point) is performed through a shared memory, exclusive memory accesses for the synchronization occurs in a concentrated fashion in the multiprocessor, thus raising the problem of overhead due to contention of data communication paths and the like.

As indicated from the above, process synchronization and scheduling are very much correlated. For applications involving certain kinds of parallel processing programs, adjustment of scheduling can improve performance. In a conventional OS, however all processes are scheduled based on the same algorithm, so that scheduling cannot be adapted to individual processes.

The following are relevant to the background of the present invention.

1. "Stellix: UNIX for a Graphics Supercomputer", Proceedings of the Summer 1988 USENIX Conference, Jun. 20-24, 1988, San Francisco, Calif., USENIX Association, pp. 321-330, Thomas J. Teizeira & Robert F. Gurwitz.

This article appears to disclose that a fault signal is generated by hardware when all the processes are in a wait state during synchronization operation by a special instruction stream for synchronization. However, that article does not even suggest that a process itself should check certain conditions using processor information in a shared memory (as stated later, the information desired includes data on dispatching of processes to processors, on grouping of processes and on process synchronization) to issue a rescheduling request and to provide effective process synchronization.

2. IBM Technical Disclosure Bulletin Vol. 32, No. 1, Jun. 1989, pp. 260-262, "DEVICE THAT PROVIDES FOR CONTENTION-FREE BARRIER SYNCHRONIZATION IN A MULTIPROCESSOR".

3. IBM Technical Disclosure Bulletin Vol. 31, No. 11, April 1989, pp. 382-389, "LOW-COST DEVICE FOR CONTENTION-FREE BARRIER SYNCHRONIZATION".

The above articles (2) and (3) disclose hardware configurations for performing barrier synchronization in a concentrated fashion, but does not even suggest any design for synchronization waiting.

4. H. S. Stone, "High Performance Computer Architecture", Addison-Wesley, Reading, Mass., 1987.

This text book provides a tutorial explanation about barrier synchronization in general.

SUMMARY OF THE INVENTION

To achieve the above object, according to one aspect of the present invention, synchronization through the use of a shared memory is employed to decrease overhead. Information about system processor resources is made available from processes. The information provided includes data on dispatching of processes to processors, on grouping of processes and on process synchronization. A process in a loop for synchronization waiting checks the information about the system processor resources in addition to synchronization variables, and after that, when the resultant check determines that synchronization cannot be established in a short time under that situation, the process stops the busy waiting operation, and returns control to the scheduler so that the scheduler does rescheduling or changes the dispatching of processes.

According to another aspect of the present invention, a dedicated register is prepared for each processor for barrier synchronization wherein a plurality of processes are simultaneously waiting, and a dedicated communication path is also provided for exchanging information among the registers, so that the overhead of barrier synchronization is reduced.

Further hardware to support checking for processor resource information is provided to reduce additional overhead additionally caused by checking. In this case, initiation of rescheduling is signaled by an interrupt.

Furthermore, the scheduler may be user-customizable so as to enable suitable rescheduling. In addition, the scheduler may be configured in a hierarchical manner so that customization under the control of an OS is achieved. In other words, each group of processes operating in parallel to perform an application is under control of a user scheduler for that application. In addition, in order to reduce the overhead of interruption which is indicative of rescheduling, and in order to enable the use scheduler to communicate with other processors asynchronously with reduced overhead, interruption by processors is made hierarchical and interruption of lower priorities may be made available to the user. In this configuration, when interruption occurs during the running of the user application (during user mode operation), control is only transferred to an interruption program which is set by the user in advance, and need not be transferred to the OS (kernel mode operation).

Accordingly, it is an object of the present invention to provide a multiprocessor system capable of reducing overhead due to synchronization among processors, and to reduce ineffective scheduling.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIGS. 2 to 5B are block diagrams illustrating conditions for rescheduling requests used in a preferred embodiment of the invention;

DETAILED DESCRIPTION OF THE INVENTION

Section 1. Explanation of principle

Subsection 1.1 Context of the invention

Since one of the objects of the present invention is to reduce the overhead arising out of synchronization, the invention employs the busy waiting approach using shared memory or the like. The use of an OS causes overhead increase as previously stated. Accordingly, the following two problems occur as described above:

(1) One or more processes, each ineffectively waiting for synchronization, are dispatched to processors, and then waste processor resources.

(2) During barrier synchronization, exclusive memory accesses are concentrated, and contention for a data path causes an overhead.

First, the problem (1) is detailed and the direction to resolve it is shown. Consider a case where a plurality of processes are together performing a certain operation in cooperation with one another (parallel processing). And assume that during this operation, more than one other process is in a waiting state for synchronization. And further assume that the first process comes off a waiting state, and that the other processes are waiting for the former process output or calculation result. Also assume that the number of processes is larger than the number of processors, so that all of the processes cannot be dispatched to the processors simultaneously. In this situation, since synchronization is achieved through a shared memory, the OS cannot determine whether or not a process is in a waiting state. Therefore, depending on scheduling, only the processors waiting for synchronization can be dispatched, and the process which is not at a synchronization waiting state and should be performed at the highest priority can be in a state waiting for dispatching. In this case, the processor resources continue to be wasted until the process not waiting for synchronization gets dispatched to a processor upon a change in rescheduling via timer interruption occurring at a certain interval.

To resolve the wasted resources problem, an event has to be determined where all the processors are occupied with processes waiting for synchronization. Accordingly, in a busy waiting loop waiting for synchronization, not only synchronization variables but also information related to system processor resources are checked. Depending on the result of checking, under some situations the operation is stopped and the control is transferred to the OS and rescheduling is performed to change the dispatching of processes to processors. In that approach, the number of processes doing ineffective synchronization waiting can be reduced and the system processor resources are more effectively used. A method for identifying such situation is detailed in subsection 1.2, and a method of rescheduling is provided in subsection 1.3.

Next, the problem of concentrated exclusive memory accesses during barrier synchronization is addressed and an approach to resolve it is put forth. When barrier synchronization is achieved in a system having N processors by using one synchronization variable, exclusive manipulation to the variable is required at least N times. Memory operations for that manipulation are serialized, so that overhead increases as a function of N. In particular, the overhead problem becomes serious when granularity of processes in barrier synchronization are almost the same size and all the processes are dispatched to processors simultaneously, that is, in the situation where there are no processes awaiting dispatching.

To avoid the kind of overhead described above, a control variable dedicated to barrier synchronization is provided in a dedicated register (a flag is used in the present invention) for each processor, and modification among the registers is achieved through a dedicated communication path for synchronization information (signal lines of a broadcast type are also used in the present invention). Using such facilities, barrier synchronization is achieved without an increase in communication volume over a data communication path. Of course, when one or more processes are awaiting dispatching, an operation according to the problem resolving approach (1) is performed. A detailed configuration is described in Section 2.

Subsection 1.2 Conditions for switching processes and detection method for the conditions Conditions under which a process waiting for synchronization gives up the dispatching by itself are now described and information is provided concerning system processor resources that are required to check for these conditions. Thus here is introduced the idea of "a group of processors", to manage processor resources effectively. Basically, processes in synchronization with one another by a shared memory constitute a group. In other words, processes each belonging to different groups do not keep busy waiting synchronization with one another using the shared memory. Processors each "belong to" groups of the processes running on the processors. Processors to which one group of processes are dispatched constitute a group of processors. In FIG. 1, processes A1, A2, A3 and A4 constitute one group of processes, and according to the dispatching as shown, CPU1, CPU2 and CPU3 constitute one group, and CPU4 belongs to another group. When using a UNIX-like OS (UNIX is a trademark of AT&T), a Parent Process Identifier (PPID) can be used as a group identifier.

Drawings are provided to facilitate understanding the embodiment, and drawing notations which are referred to later are now described. Regarding "process A2w", the beginning "A" indicates the group name, and the next "2" indicates its number in the group, and the following "w" indicates that the process is waiting for synchronization. For a process not waiting for synchronization, "r" rather than "w" is used. Processes surrounded by broken lines at the left sides of the figures are shown as ones which are waiting to be dispatched.

Figure 2A:
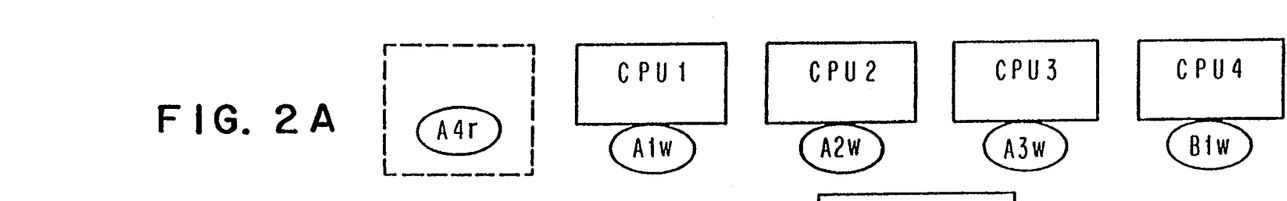
Figure 2B:
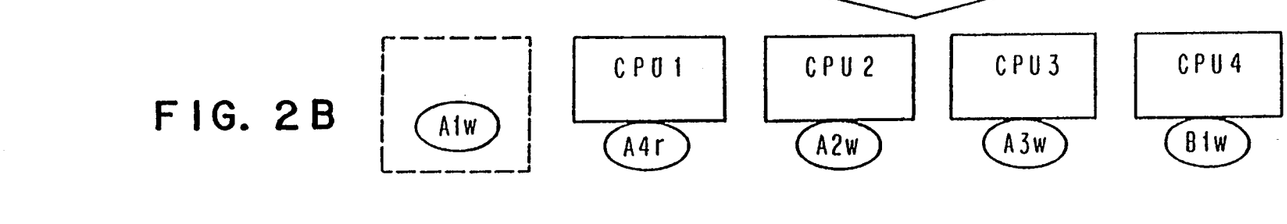

The following are examples of conditions, upon each of which, a process waiting for synchronization stops its operation and requests a process switch:

[1] All of the processors in the group of processes concerned are waiting for synchronization and one or more processes are waiting for dispatching. See FIG. 2(a).

Figure 3:
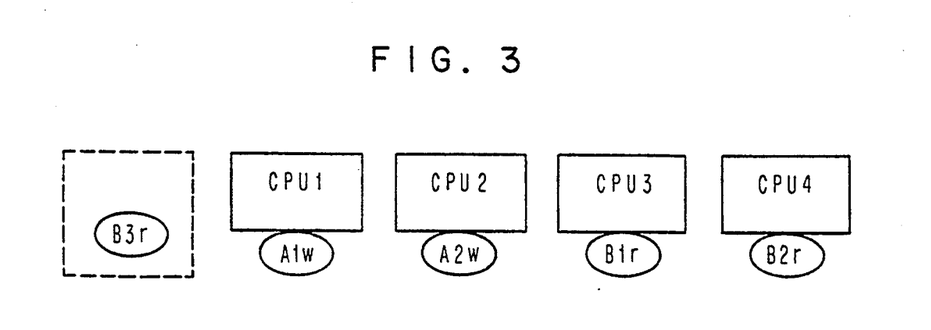

[2] All of the processes in the group of processes concerned are dispatched to processors and waiting for synchronization at one time; this event occurs due to programming errors (deadlock). See FIG. 3.

Figure 4A:
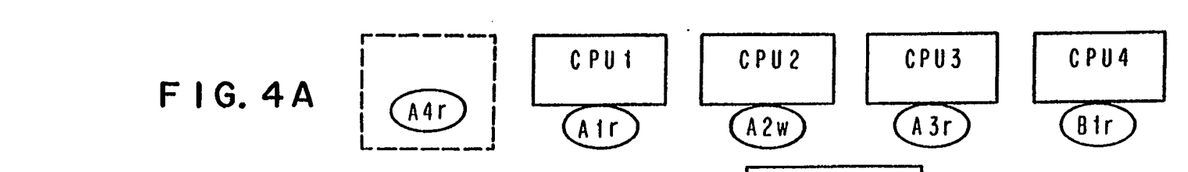
Figure 4B:
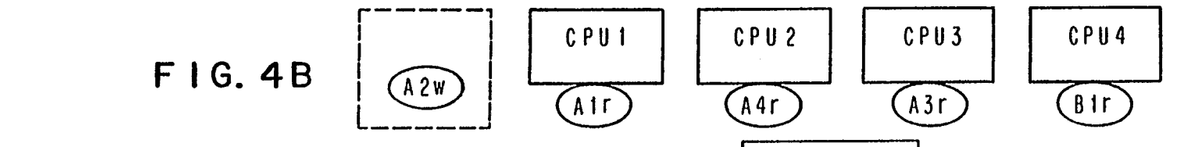

[3] The processor concerned is a member of a group which consists of processes performing a barrier synchronization, and one or more members of the group is waiting for dispatching but not waiting for synchronization. See FIG. 4(a).

[4] The number of processors waiting for synchronization in the group of the process concerned is more than "n", and one or more processes are waiting for dispatching ("n" is a value which an OS or user can set).

Figure 5A:
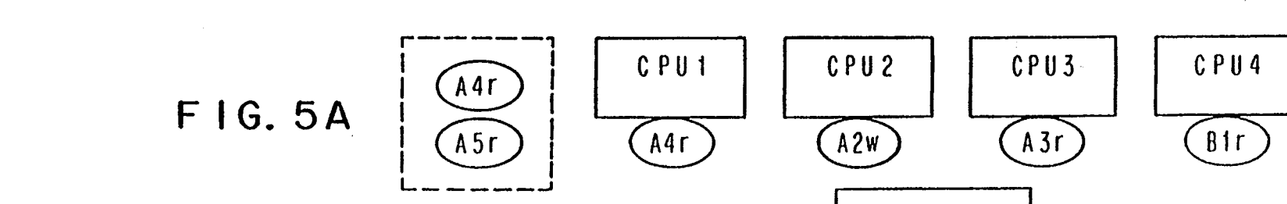
Figure 5B:
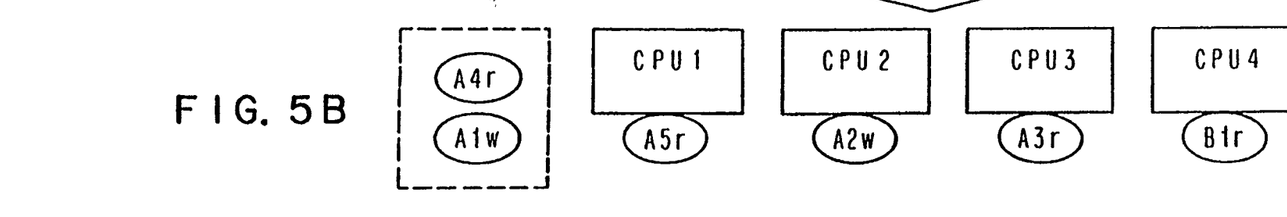

[5] The number of processes waiting for synchronization in the group of the processes concerned is more than "n", and one or more processes in the group of the process concerned are waiting for dispatching. See FIG. 5.

Each of [1], [2] and [3] is a condition for improving the theoretical effectiveness, and each of [4] and [5] is a condition for doing the same by determining "n" heuristically, or from experience. Depending on the application which is running, "n" is adjusted in order to improve efficiency. With respect to conditions [4] and [5], instead of the number of processors waiting for synchronization, the ratio of the number of processors in the group to the number of processors waiting for synchronization in the group is used.

Information about system processor resources, which are required for checking the above conditions are as follows:

MSG (the number of M Group CPU's): the number of processors which belong to the group of the process concerned (the number of processes in the group of the process concerned, which are dispatched to processors).

MWC (the number of M Group Waiting CPU's): the number of processors which belong to the group of the process concerned and is waiting for synchronization.

MGP (the number of M Group Processes): the total number of processes belonging to the group of the process concerned.

PRQ (the number of Processes in Run Queue): the number of processes waiting to be dispatched.

MPRQ (the number of M Group Processes in Run Queue): the number of processes waiting to be dispatched in the group of the process concerned.

MNWR (the number of M Group Not-Waiting Processes in Run Queue): the number of processes waiting to be dispatched but not waiting for synchronization in the group of the process concerned.

TVPS (Threshold Value for Process Switch): the value "n" mentioned above.

These values should be referenced by a user process at a low cost and the values stored as variables which can be accessed both by users and an OS kernel. With respect to data integrity and access privilege, it is noted that only #MWC is set by a user application process. Other values are set only by an OS scheduler. The scheduler modifies these values at each scheduling time as needed.

Figure 6:
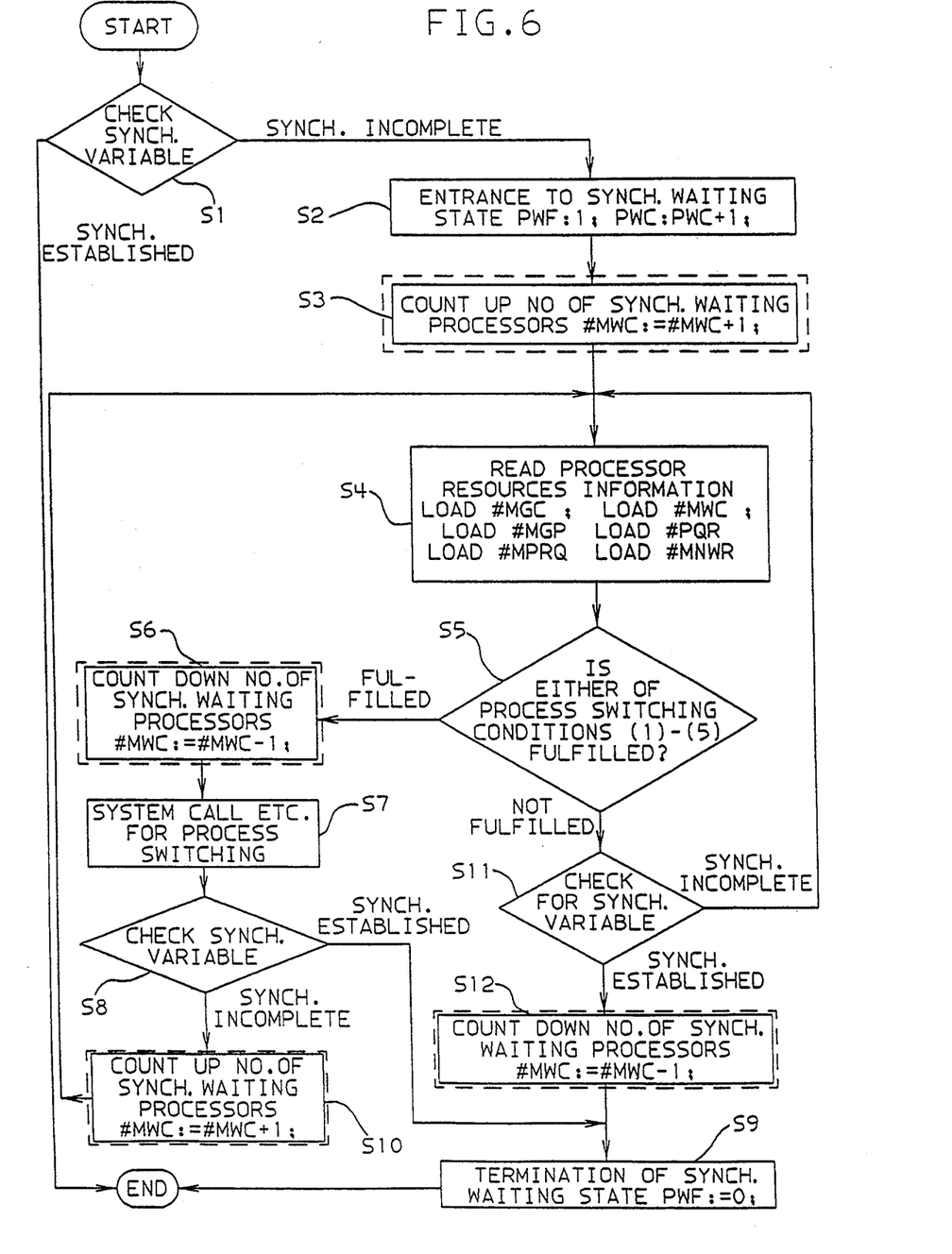
FIG. 6 is a flow chart describing the above embodiment.

An efficient busy waiting synchronization method is described with reference to the flowchart of FIG. 6, which also comprises a step for checking conditions for switching processes described previously. The specific method and the like for checking the conditions depends on the number and variety of processes waiting to be synchronized. In this description, in order to facilitate a better understanding, the reader is directed to the example as shown in FIG. 6. Reference to the details shown therein are made below.

Figure 7:
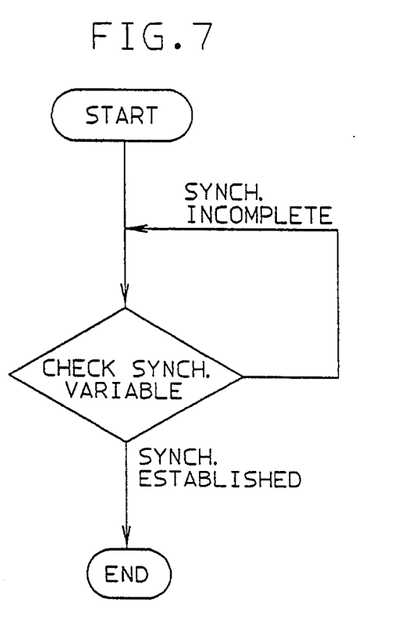
FIG. 7 is a flow chart describing the corresponding part of the conventional method to the flow shown in FIG. 6.

FIG. 7 shows a conventional loop for waiting. In FIG. 6, a synchronization variable is checked at the beginning of the procedure (S1) in order to incur as little overhead as possible as compared with the conventional method. The ideal case is one in which synchronization is established and the synchronization variable is set to a value established before checking the synchronization variable a first time. If synchronization has completed, a waiting operation is immediately terminated. Only if the first time check indicates that synchronization has not completed, does the processor enter a synchronization waiting state (S2). In this state, variables to be affected by the entrance, for example, #MWC etc., are modified (S3). Information about system processor resources is read out (S4); determination is made of whether or not the process concerned should be terminated; and the scheduler is requested to reschedule processes depending on the above mentioned conditions (S5). If either of the conditions is fulfilled, variables to be affected are modified (S6), and the scheduler is invoked using a system call for transferring control of the processor and the like (S7). If neither of the conditions is fulfilled, synchronization variables are newly checked (S11). If synchronization is not established, operation returns to the read-out step of processor resource information and the procedure is iterated. If synchronization is established, the processor concerned completes the synchronization waiting state, and then affected variables (#MWC etc.,) are modified (S12), and the waiting operation is terminated (S9). When the process which has transferred control of the processor is again dispatched to that processor or another processor, the operation joins the flow taken when neither of the conditions for process switching is fulfilled (S8, S10).

The blocks surrounded additionally by broken lines are involved with exclusive and indivisible access to the shared memory (#MWC). In a system having a shared bus, these accesses are performed with lock operations. It is likewise in the following other figures.

In some hardware configurations, a problem exists in regard to concentrated access to shared variables. The problem is raised because variables defining processor resources shared by processors are accessed in the innermost loop. In a system without hardware units, such as memory caches which are capable of keeping consistency of content ("snoopy" caches), the shared memory may be frequently accessed at a high cost, and communication contentions over communication paths may be raised. This problem also exists in conventional approaches to this problem in which access to synchronization variables, which are shared variables, is similarly made in the most inside loop. Accordingly, this is not a problem caused only by the present invention. In the following description, it is assumed that the system has hardware such as caches capable of keeping consistent memory content.

Figure 8:
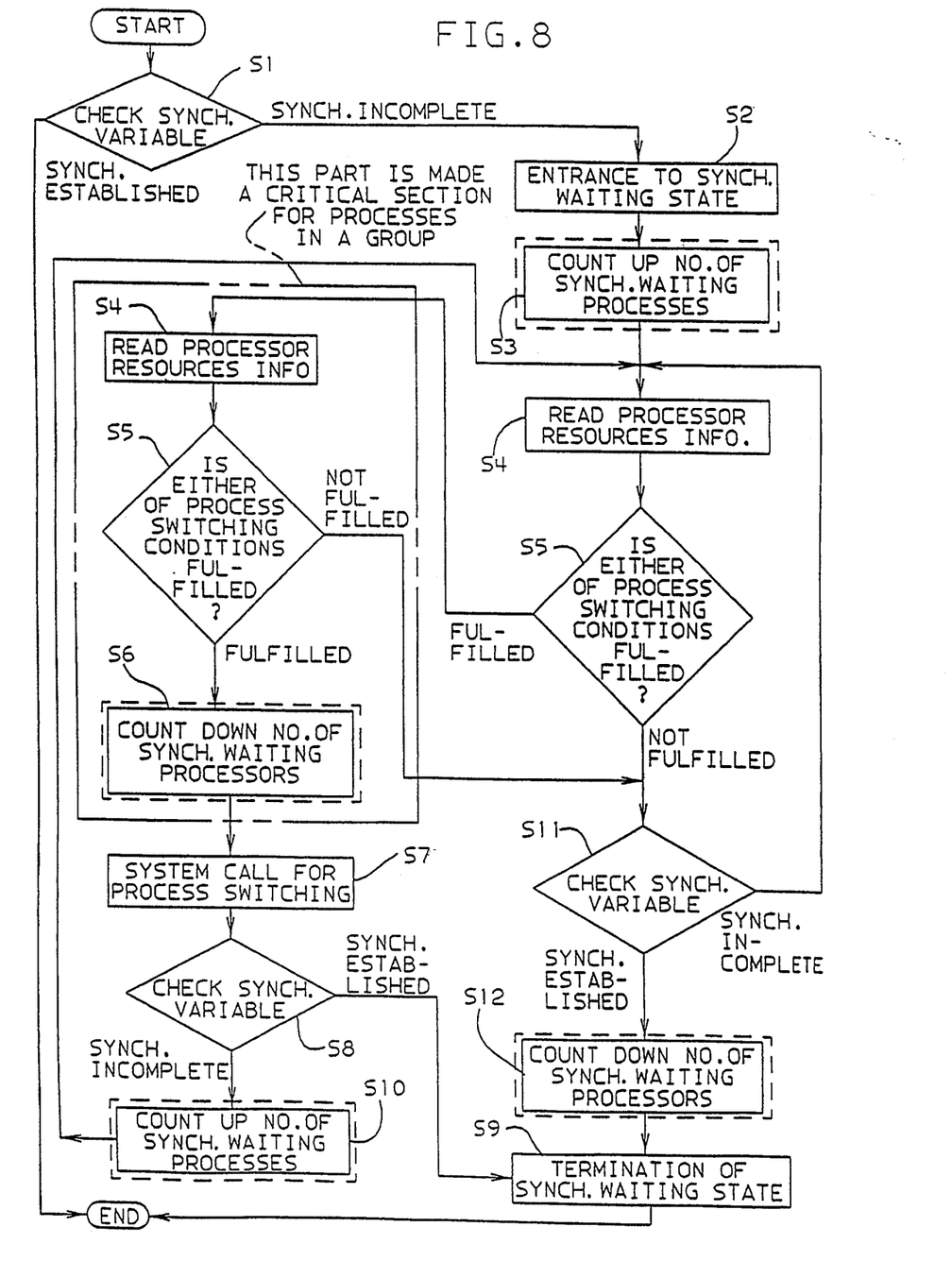
FIGS. 8 to 10 comprise two flow diagrams and a block diagram describing modified versions of the above preferred embodiment of FIG. 6.

As shown in FIG. 8, in a system having "snoopy" caches, a spin lock is used to suppress the necessity for ineffective process switching, without increasing overhead. In particular, in the method shown in FIG. 6, a plurality of processes can fulfill either of the conditions of process switching at one time and many process switching requests can then be concentrated. Accordingly, as shown in FIG. 8, operations requesting process switching are set as critical sections and controlled exclusively to prevent such a concentration of requests. It should be noted that if exclusive access (a bus lock, etc.) to the shared memory for exclusive control of the critical section occurs in the most inside loop of the busy waiting operation, accesses to the shared memory are concentrated and the overhead becomes large. In this regard, in the innermost loop, no critical section is provided and instead the conditions for process switching are only checked, and if either of the conditions is fulfilled, a critical section is entered to check the conditions again (spin lock, S4', S5'). In addition, in the method shown in FIG. 8, when the scheduler switches among processes and modifies variables which define system processor resources, accesses are exclusively controlled. Details are omitted in FIG. 8 insofar as portions are analogous to the corresponding portions of FIG. 7.

A waiting state flag (PWF: Process Waiting state Flag) and a waiting state counter (PWC: Process Waiting state Counter), as shown in FIG. 6, are prepared for each process, and using these data the scheduler calculates the value of #MNWR, and also determines scheduling. A detailed description is given below in subsection 1.3.

Figure 9:
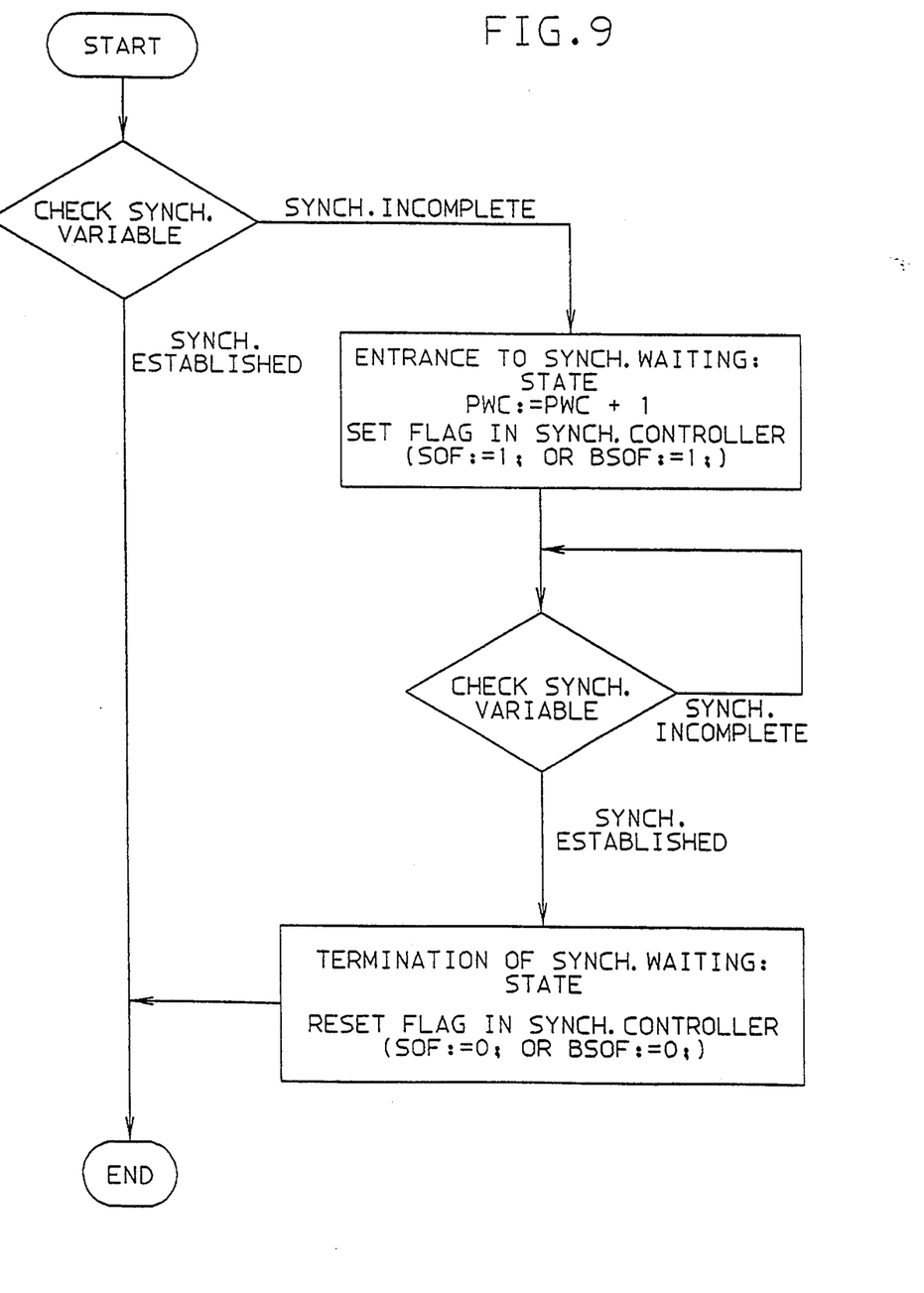

For a program having a relatively fine granularity, the new method causes a larger overhead than conventional methods. For example, when a group of processes frequently requires synchronization and the processes are dispatched to processors at one time, synchronization is established immediately after entrance to a waiting state, so that the loop of synchronization waiting is performed only one or two items. Processing cost for one loop of the synchronization waiting in the new method is, apparent from FIGS. 7 and 8, higher than the conventional method. Therefore in the case of one or two loops performed, the overhead required for operations beginning with synchronization establishment (any process can modify a synchronization variable) and ending with detection of the establishment and termination of the waiting procedure, is not negligible. To resolve this problem, a hardware mechanism is provided which detects outside a processor whether or not the processor is in a synchronization waiting state. As a result, a hardware mechanism can determine whether or not processes in a synchronization waiting state should be switched and inform the processor of fulfillment of either of the conditions by providing an interrupt. The processor then performs synchronization waiting as shown in FIG. 9. Accordingly, even in the above mentioned severe case, the overhead of the new method can be comparable to conventional methods.

Subsection 1.3 Improved Rescheduling

FIGS. 2, 4 and 5 show examples of the progression of rescheduling states after the fulfillment of conditions [1], [2] and [3] respectively (as defined and identified above via bracketed numbers). When a plurality of processes are waiting to be dispatched, it is important in terms of efficiency to correctly select which processes are dispatched to processors. Further in FIG. 3, a deadlock occurs in regard to group A, so that rescheduling halts the performance of all the processes in group A. How the scheduler performs the rescheduling operation is now described. In addition, when more processes than processors perform parallel processing together, rescheduling inevitably occurs, and when the granularity is fine it occurs frequently. Accordingly, it is very desirable to suppress as much as possible overhead which is due to rescheduling and to make parallel processing more applicable. A hierarchically driven scheduler which provides such reduced overhead is described below.

Figure 4C:
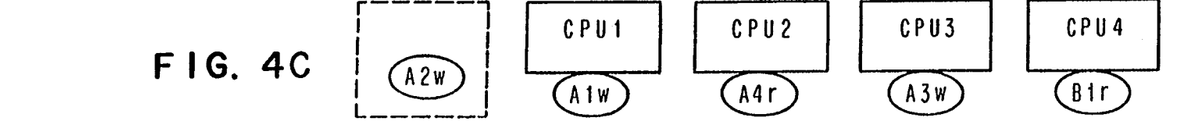
Figure 4D:
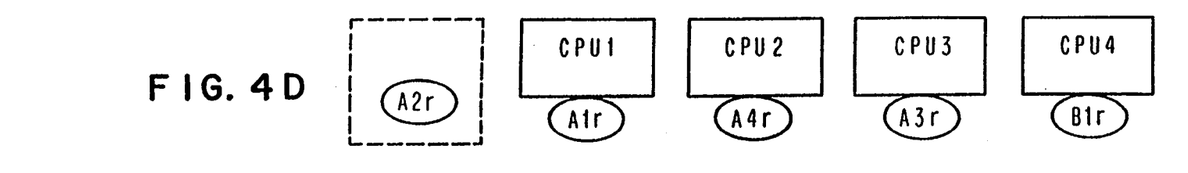

The above mentioned values of waiting state flag (PWF) and waiting state counter (PWC) are data used by the scheduler to calculate #MNWR and to assist the scheduler in performing rescheduling. The initial values of both are "0", and PWF indicates by "1" that the process concerned is in a waiting state, and PWC indicates the frequency with which the process enters a synchronization waiting state. Using PWF and PWC, a process detects whether or not it is in the same synchronization state as other processes. With this result, even if condition [2] is not fulfilled, a deadlock can sometimes be detected. For example, when all the processes in a group are in a synchronization waiting state and all the processes keep the same synchronization waiting state after all the processes are dispatched once to a processor, a deadlock is indicated. The operation should be then terminated. Further, a scheduling method can be employed which assigns a priority to one or more processes not waiting for synchronization. For barrier synchronization, PWCB (Process Waiting Counter for Barrier) is provided carefully. PWCB, unlike PWC, indicates how frequently the process performs waiting operations. That is, PWCB is modified immediately before checking synchronization variables at the beginning of FIG. 6. When all the processes in a group keep barrier synchronization, all of the synchronization values of PWCG match one another, so that processes to be scheduled next can be determined. It should be noted that, as shown in FIG. 4(c) and (d), a process waiting to be dispatched and also waiting to be synchronized, gets out of synchronization while waiting for establishment of synchronization. Accordingly, it is necessary to modify #MNWR upon establishment of synchronization.

In addition to the above, for some applications, information about the combinations of processes which are synchronized with one another frequently can be obtained in advance. Scheduling depending on information particular to each application provides better results.

Next, hierarchization of the scheduler is described.

Scheduling is usually performed by the kernel of the OS. Hence, in order for a user process to get rescheduling started, a system call is required to the kernel. The scheduler in the OS cannot however generally perform adaptive scheduling for each application. In addition, the kernel of the OS and user processes share much data, so that procedures for communication become complicated and overhead also increases. Furthermore, a system call itself causes a heavy overhead, so that it is difficult to switch among processes frequently.

Figure 10:
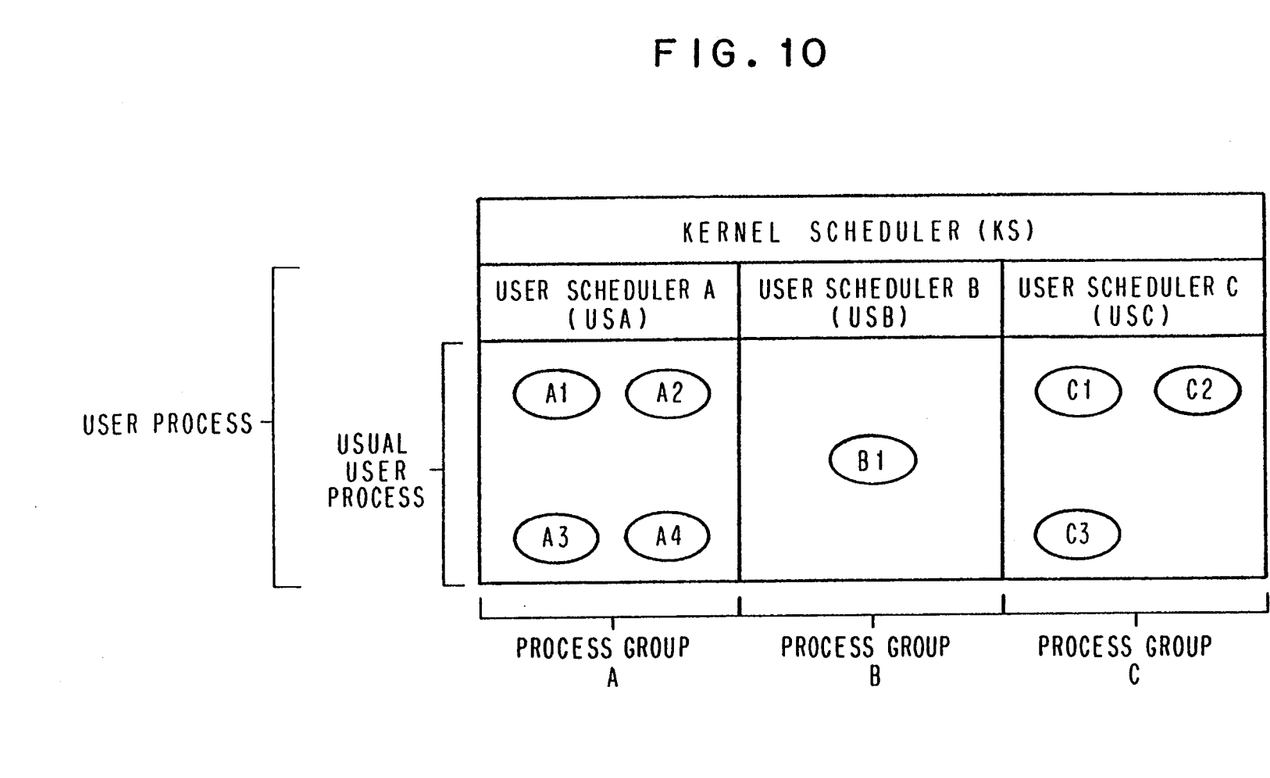

To resolve these problems, a scheduler is hierarchized. A part of the scheduler for allocating real processors is conventionally referred to as a "kernel scheduler", and user schedulers are provided under the control of that kernel scheduler (see FIG. 10). A user scheduler is provided for each group of processes which execute an application in cooperation with one another, and its scheduling method is determined by a user in accordance with the operation. The kernel scheduler controls all of the real processors, and it assigns one or more real processors for each process group. Each user scheduler performs scheduling among processors assigned to it. In addition, the user schedulers do not operate in the kernel (kernel mode) but on the user side (user mode). Accordingly, the user schedulers do not need system calls for process switching and they do not cause any overhead. This improves efficiency.

Figure 11:
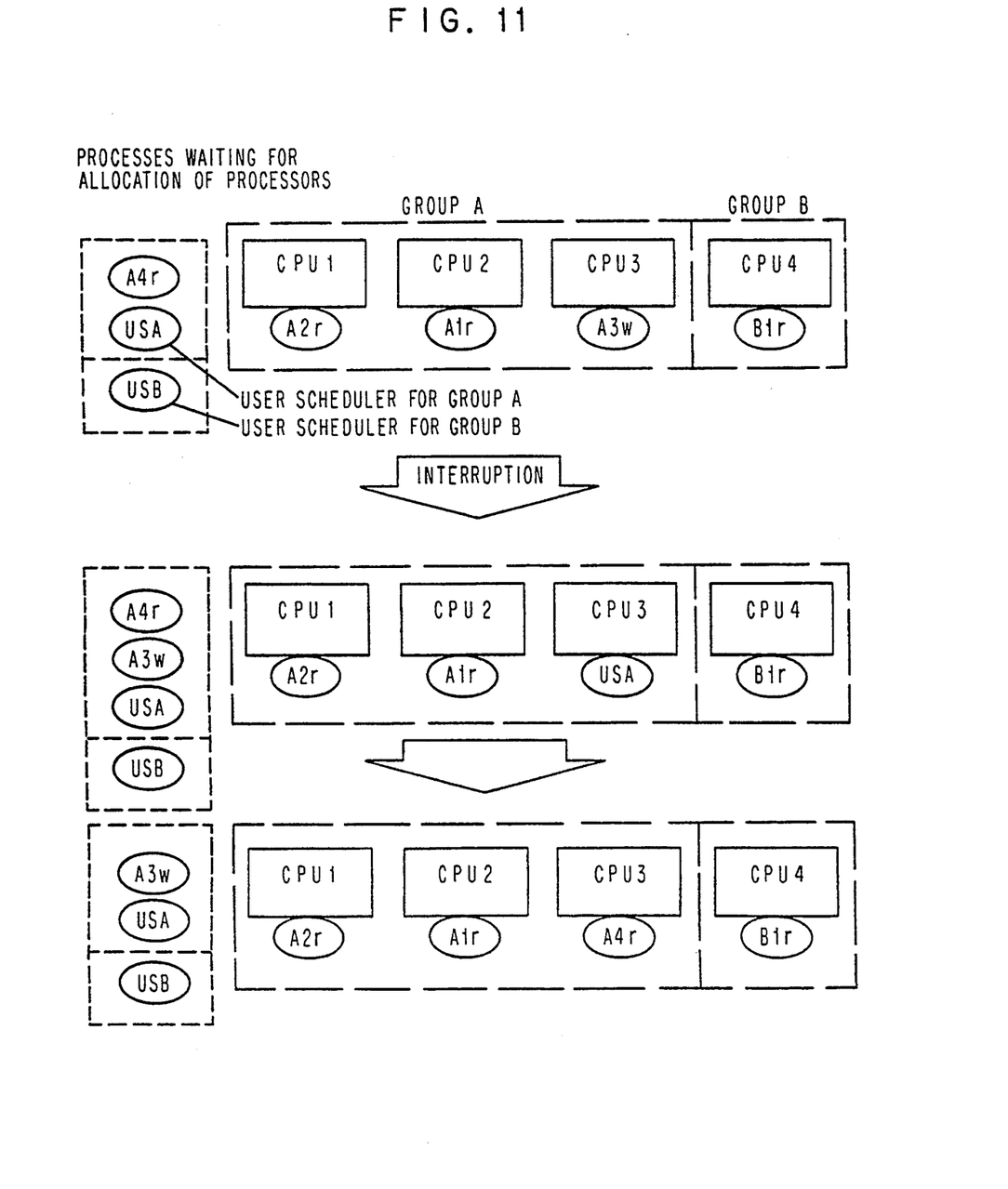
FIG. 11 is a block diagram describing a further modified version of the embodiment of FIG. 10.

When one of the switching conditions is fulfilled, control is transferred to a corresponding user scheduler, which in turn selects one or more processes to be dispatched in accordance with a scheduling algorithm suited for the corresponding process group, and after that the control is transferred to the processes. In that way, processes are switched in the group without overhead for a system call. FIG. 11 shows an example where the group A performs process switching using a user scheduler based on condition [3].

The kernel scheduler receives from each process group the number of processors which it requests, and performs scheduling in such a manner that the request from each group is satisfied as much as possible. The kernel scheduler is initiated upon timer interruption for time sharing or upon a system call during input/output operation of a peripheral device or upon a request or return of processor resource from a user scheduler. When scheduling by the kernel scheduler causes one or more free processors to be required, the processors of the lowest priority group are taken (preempted).

In a configuration where the determination of conditions for process switching in regard to synchronization is implemented in hardware and a processor is informed of fulfillment of conditions by interruption, user schedulers are designed to be initiated by the interruption. In a conventional processor which discriminates during operation between the kernel side and the user side, control is transferred to the kernel after the interruption. Use of such conventional processors requires that the control be returned to a user with overhead suppressed as much as possible during that interruption. In this regard, processors having a hierarchical interruption function, which is described below, allow interruption without overhead on the user side. That is, processors are provided with interruptions of different priorities, and some interruption of lower priorities are assigned to interruption of the user mode. Upon such interruption, control is transferred in the user mode to a routine designed by the user. The remaining types of external interruption are to the kernel mode as is conventional. Further interruption in the user mode is designed by modifying an interruption mask (switching between enabled and disabled states of each interruption) as the user chooses. When such an interruption in the user mode occurs for synchronization and asynchronous communication among processors in a group, control is never transferred to the kernel and overhead is this decreased. For interruptions from the synchronization mechanism, control is designed to be directly transferred to the user scheduler.

Section 2. Detailed Configuration

Next, the detailed configuration of the synchronization mechanism is described. In this configuration, to reduce the overhead of a busy waiting operation, determination of conditions for process switching is preferably implemented in hardware. The scheduler is designed as hierarchized according to the description in subsection 1.3, and preferably implemented in software. In the following, the hardware for the synchronization mechanism and an operation of busy waiting used in that mechanism are mainly described.

Figure 12:
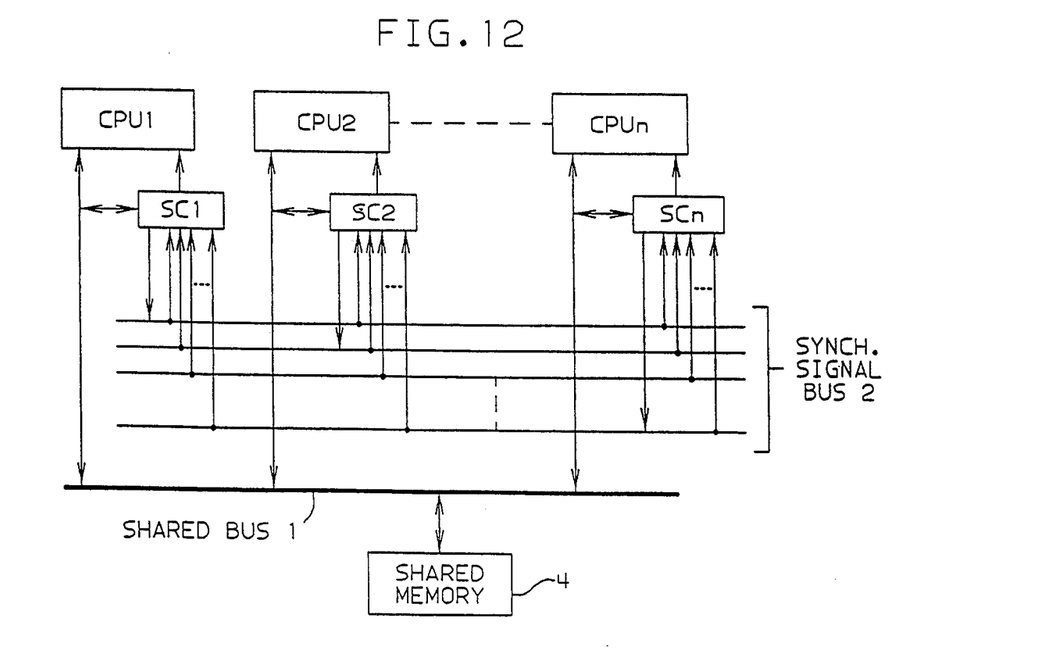
FIGS. 12 and 13 are block diagrams illustrating a detailed configuration of the embodiment shown in FIG. 6.

FIG. 12 shows the whole configuration, in which a shared bus 1 is used as a data communication path. For processors CPU1, CPU2, . . . , CPUn, synchronization controllers SC1, SC2, . . . , SCn are provided respectively. The synchronization controllers are connected to synchronization bus 2 (signal lines of broadcasting type) which consists of the same number of signal lines as the processors. Each processor and its corresponding synchronization controller is connected via a data line for read/write operations of registers and flags in the controller and via an interruption line (for the above mentioned interruption in the user mode) from the controller to the processor.

Figure 13:
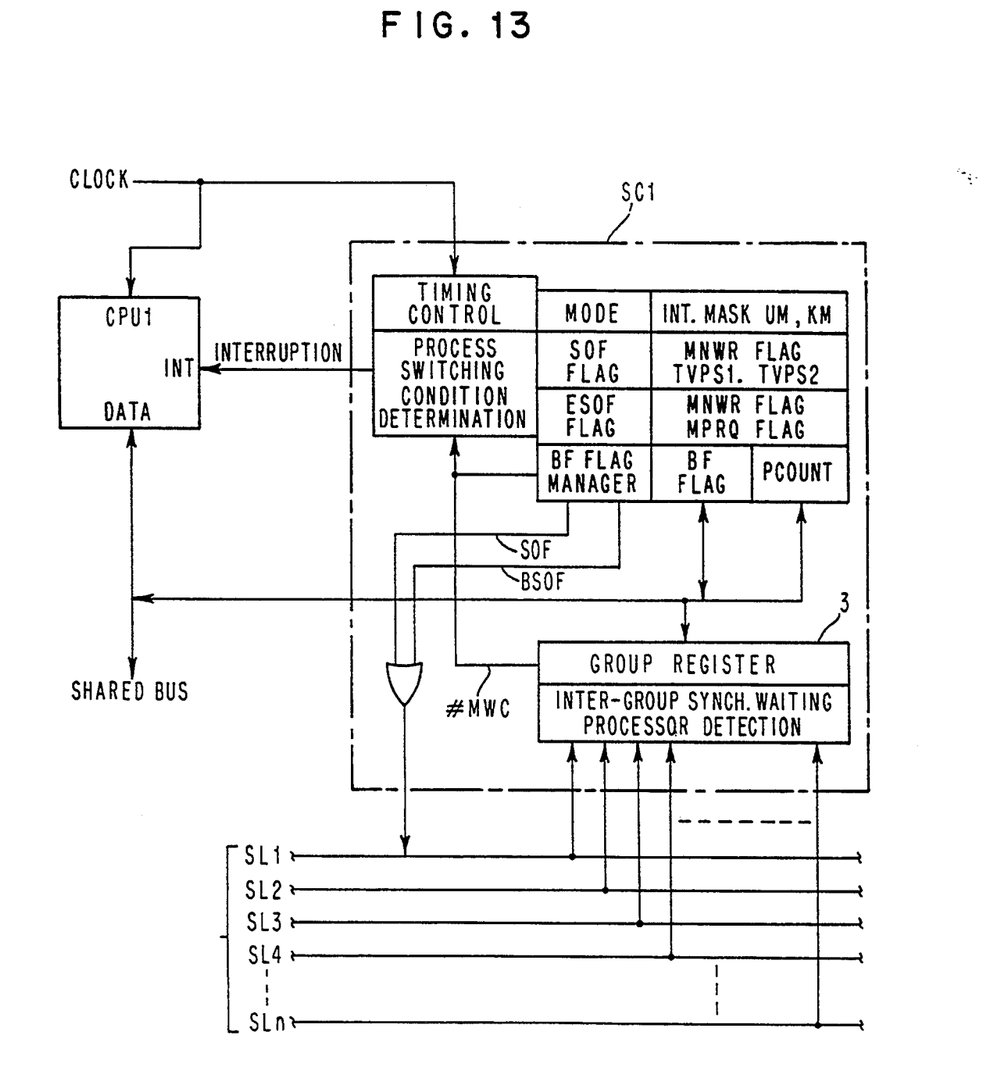

FIG. 13 shows the configuration of synchronization controller SC1. It should be noted that other synchronization controllers have the same configuration. In this figure, individual lines of synchronization bus 2 are assigned to system controllers SC1, SC2, . . . , SCn respectively, and each of the system controllers provides output signals (binary value of "0" or "1") on only its corresponding signal line. The signal generated corresponds to a synchronization output flag (SOF) in the corresponding controller or a barrier synchronization output flag (BSOF). When SOF (or BSOF) is reset, a "0" signal is provided on the line. In the initial state, SOF and BSOF are reset, and SOF (BSOF) is set before the relevant processor enters a synchronization loop using shared memory 4, and it is reset after the processor passes through the loop (see FIG. 9). Accordingly, the signal line in the synchronization bus corresponding to each process waiting for synchronization is set to "1". In addition, in the synchronization controller, a group register 3 is provided, which is set to "1" by the corresponding scheduler at the location corresponding to the processors belonging to the group of the corresponding processor. Therefore, the synchronization controller determines whether or not each of the processors belonging to its group is in a synchronization waiting state.

The synchronization controller has two operation modes. Mode 1 corresponds to the above mentioned problem (1), and mode 2 to problem (1) in barrier synchronization and the above mentioned problem (2) (condition [3]). While each controller assumes only one mode at a time, different modes are assumed for different groups. Switching of the modes is performed using a register (MODE) in each controller.

Registers and flags common in a group can be written simultaneously through a shared bus. That is, the scheduler can output, on the shared bus, a command with a designated group. This command modifies registers in the controllers in the designated group. Likewise, the scheduler can modify registers in any processor other than one connected to the scheduler.

As shown in FIG. 13, registers or the like which can be set in such a manner by the scheduler include Group Register 3, MODE, UM, KM, PRQ flag, TVPS1, TVPS2, MPRQ flag, MVWR flag and PCOUNT. Among those flags, UM and KM are interruption masks for the user scheduler and the kernel scheduler respectively. When either of them is set, interruption of the processor is prohibited. Of course, the kernel scheduler can modify all the registers and flags. PRQ flag, TVPS1, TVPS2, MPRQ flag and MNWR flag are for storing information about processor resources. PRQ flag, MPRQ flag and MNWR flag correspond to #PQR, #MPRQ and #MNWR respectively (in subsection 1.2). When the count is "0", then the flag is reset, and when the count is other than "0", then the flag is set. TVPS1 (or TVPS2) is a register for setting a value to be compared to the value of #MWC for conditions [1], [2], [4] and [5] (as described above). For example, in order to check conditions [1] or [2], h1 is set by #MGC. PCOUNT is a counter for counting occurrences of preemption processes in a group by the kernel. The counter is counted up when the kernel scheduler preempts, and it is counted down when the user scheduler operates for the preemption. Accordingly, the controller can keep enough information about the occurrence of preempting and prevents erroneous operation.

First, operation in mode 1 is described. As mentioned above, the controller has registers or the like for storing information about processor resources, and the scheduler sets values for the registers or the like. For #MWC, the synchronization controller monitors the synchronization bus and keeps informed. The above mentioned conditions [1] to [5] about the system status are checked by the hardware mechanism, and upon the fulfillment of either of the conditions an interruption signal is supplied to the processor, and rescheduling by the OS is requested.

Figure 14:
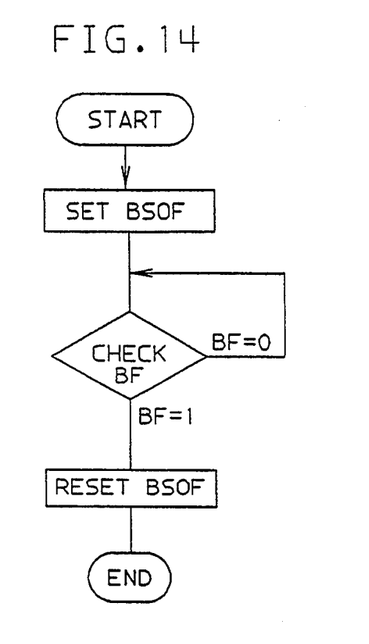
FIG. 14 is a flow chart illustrating the configuration of FIG. 12.

Next, operation in mode 2 is described. In addition to the above mentioned registers and flags, a read only barrier synchronization establishment flag (BF) is provided in the synchronization controller. It should be noted that the scheduler can perform a read/write operation without side effect. The BF flag is set to "0" when the MNWR flag is rest to "0", PCOUNT is "0", and all the processors in the group of the process concerned are waiting for synchronization. After the processor reads "1" as the flag bit, the controller performs the following operations and automatically resets the flag. First, the controller sets its synchronization line and BSOF to "0", and when the MPRQ flag is not "0", then the MNWR flag in the controller is set to "0". After that, the BF flag is reset. The program uses the BF flag for waiting. Although in mode 1, BSOF is set and the synchronization line is "1" in mode 2. Like the automatic resetting of BSOF, the BF flag is automatically set upon the first reading immediately after the establishment of synchronization. Accordingly, there is no need to set the BF in the busy waiting operation. Likewise, the count-up of PWCB can be automated. The waiting operation is accordingly shown in the flow chart of FIG. 14. To prevent erroneous operations during creation or deletion of processes by the scheduler, the following control scheme is implemented. For example, when processes are created to participate in barrier synchronization, the MNWR flag in the controller is set to "1" to prohibit interruption, and after all the processes are created, a correct MNWR flag is set and an interruption is allowed. Further, the synchronization controller checks for condition [3] and generates interruption to the processor to switch processes when the condition is fulfilled. It should be noted that when PCOUNT is other than "0", the same control scheme is implemented as when the #MNWR flag is not "0", and an erroneous operation is prohibited.

The registers in controllers SC1, SC2, . . . , and SCn are modified as required each time processes are switched, and SOF, BSOF, BF, MNWR flags and the like of each controller for the processor which is about to change processes, are kept behind before that change, and when the previous process is dispatched again in the future, the kept values are used to set the flags again.

As described above, in accordance with this invention, when processes executed in synchronization with one another on a multiprocessor system are dispatched to real processors simultaneously, an overhead is very small, and further even when all of the processes cannot be dispatched simultaneously due to the limited number of processors and scheduling methods, the processor resources are used efficiently.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. In a process synchronization method for a multiprocessor system having a plurality of processors and a shared memory, wherein processes being performed by said processors check for synchronization completion information stored in said shared memory while said processes remain in a synchronization waiting state, said processes end said synchronization waiting state when said synchronization completion information indicates establishment of said synchronization and said processes continue said synchronization waiting state when said completion information indicates incompletion of said synchronization, an improvement characterized in that said processes further perform the following steps while said processes remain in said synchronization waiting state:

accessing processor resource information stored in said shared memory to determine whether or not predetermined conditions which are useful for determining establishment of synchronization are fulfilled;

continuing said synchronization waiting state when any of said predetermined conditions are determined to be fulfilled; and, requesting, from a rescheduler, rescheduling of processes to be performed on said processors when none of said predetermined conditions is determined to be fulfilled.

2. In a multiprocessor system wherein synchronization among processes executed on a plurality of processors is performed through checking by each of said processes for synchronization completion information stored in a shared memory, an improvement comprising:

information requesting means for each of said processors for accessing from said shared memory, processor resource information usable to determine whether or not predetermined conditions useful for determining establishment of synchronization are fulfilled, while a process executed on said processor remains in a synchronization waiting state and for sending a rescheduling request when no predetermined condition about the establishment of said synchronization is fulfilled; and scheduling means responsive to said rescheduling request for performing rescheduling of processes.

3. In a multiprocessor system wherein synchronization among processes executed on a plurality of processors performed through checking by each of said processes for synchronization completion information stored in a shared memory, an improvement comprising:

separate memory means for each of said processors for receiving and storing information related to process synchronization;

information requesting means, for each of said processors, for accessing, while a process executed on said processor remains in a synchronization waiting state, said information from said separate memory means, and for sending a rescheduling request when predetermined conditions for determining the establishment of said synchronization are fulfilled; and, scheduling means responsive to said rescheduling request for performing rescheduling of processes.

4. A multiprocessor system in accordance with claim 2 or claim 3, further characterized in that said information includes information about assignment of one or more of said other processes to one or more of said processors, information about grouping of said processes, or information about one or more of said processes waiting for synchronization.

5. A multiprocessor system in accordance with claim 3, further characterized in that said scheduling means is provided for applications separately from an operating system, whereby no control is transferred to said operating system upon said rescheduling request.

6. A multiprocessor system in accordance with claim 5, further characterized in that said information requesting means sends an external interruption signal of a low priority level to a corresponding processor, said scheduling means corresponding to said processor performs rescheduling in response to said external interruption signal of said low priority level and control is transferred to said operating system upon an external interruption signal of a high priority level from another processor.

7. A multiprocessor system in accordance with claim 2, claim 3, claim 5 or claim 6, further characterized in that said processors each have private caches and access the content of said shared memory through said private caches.

8. In a multiprocessor system wherein synchronization is performed among processes executed on a plurality of processors, an improvement comprising:

first memory means for each of said processors for receiving first information signals related to process synchronization stored in a shared memory and for storing the same;

second memory means for each of said processors for storing designation of other processors to be barrier synchronized with said processor;

signal receiving means for each of said processors for receiving second information signals related to synchronization waiting from each of said other processors;

requesting means for at least one of said processors for determining, while a process executed on said at least one processor remains in a synchronization waiting state, based on said information stored in said first and second memory means, as an output signal from said signal receiving means, whether or not any other processor to be synchronized with said at least one processor is out of a synchronization waiting state and is waiting for dispatching, whereby barrier synchronization is not established, and for sending a rescheduling request when barrier synchronization is determined not to be established;

a synchronization signal bus for interconnecting said signal receiving means of said processors; and, means responsive to said requesting means for performing rescheduling.

9. In a multiprocessor system wherein synchronization among processes, each executed on a plurality of processors, is performed through checking by each of said processes for synchronization information stored in a shared memory, an improvement comprising:

first memory means for each of said processors for receiving first information signals related to process synchronization stored in a shared memory and for storing the same;

second memory means for each of said processors for storing designation of other processors to be barrier synchronized with said processor;

signal receiving means for each of said processors for receiving second information signals related to synchronization waiting from each of said other processors;

requesting means for at least one said processor for determining, while a process being executed on said at least one processor remains in a synchronization waiting state, based on information stored in said first and second memory means and based on an output signal from said signal receiving means, whether or not any other processor to be synchronized with said at least one processor is out of a synchronization waiting state and is waiting for dispatching, whereby barrier synchronization is not established, and for sending a rescheduling request when barrier synchronization is determined not to be established;

a synchronization signal bus for interconnecting said signal receiving means for said processors, and, means responsive to said requesting means for performing rescheduling.

* * * * *